(12) United States Patent
Scott et al.

(10) Patent No.: US 9,182,052 B2
(45) Date of Patent: Nov. 10, 2015

(54) METHOD AND APPARATUS FOR CONTROLLING GAS FLOW VIA A GAS SHUT-OFF VALVE ASSEMBLY

(71) Applicant: Sensus USA Inc., Raleigh, NC (US)

(72) Inventors: Tim Scott, Lawrenceville, GA (US); Dirk Steckmann, Cary, NC (US); Daniel W. Peace, Punxsatawney, PA (US); Doug Vargas, DuBois, PA (US)

(73) Assignee: Sensus USA Inc., Raleigh, NC (US)

( * ) Notice: Subject to any disclaimer, the term of this patent is extended or adjusted under 35 U.S.C. 154(b) by 0 days.

(21) Appl. No.: 14/193,505

(22) Filed: Feb. 28, 2014

(65) Prior Publication Data

US 2014/0225014 A1 Aug. 14, 2014

Related U.S. Application Data

(63) Continuation of application No. 12/852,684, filed on Aug. 9, 2010, now Pat. No. 8,701,703.

(51) Int. Cl.
*F16K 31/12* (2006.01)
*F16K 37/00* (2006.01)
*F16K 31/04* (2006.01)

(52) U.S. Cl.
CPC ........... *F16K 37/0083* (2013.01); *F16K 31/046* (2013.01); *F16K 37/0091* (2013.01);
(Continued)

(58) Field of Classification Search
CPC . F16K 37/0083; F16K 37/0091; F16K 37/00; F16K 31/04; F16K 17/36; F16K 31/046; Y10T 137/0753; Y10T 137/776; Y10T 37/0396; Y10T 137/7762; Y10T 137/86413; Y10T 137/8326; Y10T 137/8242

USPC ............... 137/557, 38, 487, 488, 551, 554, 137/624.13, 624.14; 251/129.04, 129.05, 251/68–71; 73/19.05, 865.8, 1.23; 700/282, 700/283, 79, 80

See application file for complete search history.

(56) References Cited

U.S. PATENT DOCUMENTS 4,070,604 A 1/1978 Usry
5,293,551 A 3/1994 Perkins et al.
(Continued)

FOREIGN PATENT DOCUMENTS

CN 1032848 A 5/1989
CN 1363023 A 8/2002
(Continued)

*Primary Examiner* — Jessica Cahill
(74) *Attorney, Agent, or Firm* — Murphy, Bilak & Homiller, PLLC

(57) ABSTRACT

The present invention comprises a method and apparatus for controlling gas flow via a gas shut-off valve assembly. In at least one embodiment, the assembly is configured to drive its shut-off valve from an open position to a closed position, in response to detecting a valve closure condition. The assembly in one or more embodiments operates as an intelligent node in an AMR network, and it interprets a received closure command as a closure condition. Additionally, or alternatively, the assembly detects abnormal operating conditions as the closure condition. Advantageously, the assembly performs initial closure verification, based on detecting movement of the valve into the closed position, and performs subsequent closure verification, based on monitoring downstream gas pressure. In the same or other embodiments, the assembly provides enhanced stand-alone reliability and safety by incorporating one or more valve clearing/cleaning routines into its operations.

2 Claims, 9 Drawing Sheets

(52) U.S. Cl.
 CPC ...... *Y10T137/0396* (2015.04); *Y10T 137/0753* (2015.04); *Y10T 137/776* (2015.04); *Y10T 137/7762* (2015.04); *Y10T 137/8242* (2015.04); *Y10T 137/8326* (2015.04); *Y10T 137/86413* (2015.04)

(56) References Cited

U.S. PATENT DOCUMENTS

| | | | |
|---|---|---|---|
| 5,650,575 | A | 7/1997 | Heyse et al. |
| 6,619,613 | B1 | 9/2003 | Akamatsu et al. |
| 6,994,309 | B2 | 2/2006 | Fernández-Sein |
| 7,025,088 | B2 | 4/2006 | Saunders |
| 7,116,070 | B2 | 10/2006 | MacKay |
| 7,225,056 | B2 | 5/2007 | Bolduan et al. |
| 7,504,599 | B1 | 3/2009 | Chesters |
| 7,540,572 | B2 * | 6/2009 | Nakamura ............... 303/122.05 |
| 8,453,674 | B2 | 6/2013 | Cordle et al. |
| 2004/0158419 | A1 * | 8/2004 | Pearson et al. .................. 702/64 |
| 2005/0016591 | A1 | 1/2005 | Griffiths et al. |
| 2005/0016592 | A1 | 1/2005 | Jeromson et al. |
| 2005/0285069 | A1 | 12/2005 | Fernandez-Sein |
| 2009/0121868 | A1 * | 5/2009 | Flanders ....................... 340/540 |
| 2009/0222220 | A1 | 9/2009 | Wilke |
| 2009/0292399 | A1 | 11/2009 | Nagase et al. |
| 2010/0037957 | A1 * | 2/2010 | Tabelander et al. ................ 137/1 |
| 2010/0102258 | A1 | 4/2010 | Naganuma et al. |
| 2011/0000287 | A1 | 1/2011 | Basic |

FOREIGN PATENT DOCUMENTS

| | | |
|---|---|---|
| EP | 1067367 A1 | 1/2001 |
| JP | S6469874 A | 3/1989 |
| JP | 09292271 A | 11/1997 |
| JP | 09317570 A | 12/1997 |
| JP | 10220615 A | 8/1998 |
| JP | 2006115610 A | 4/2006 |

\* cited by examiner

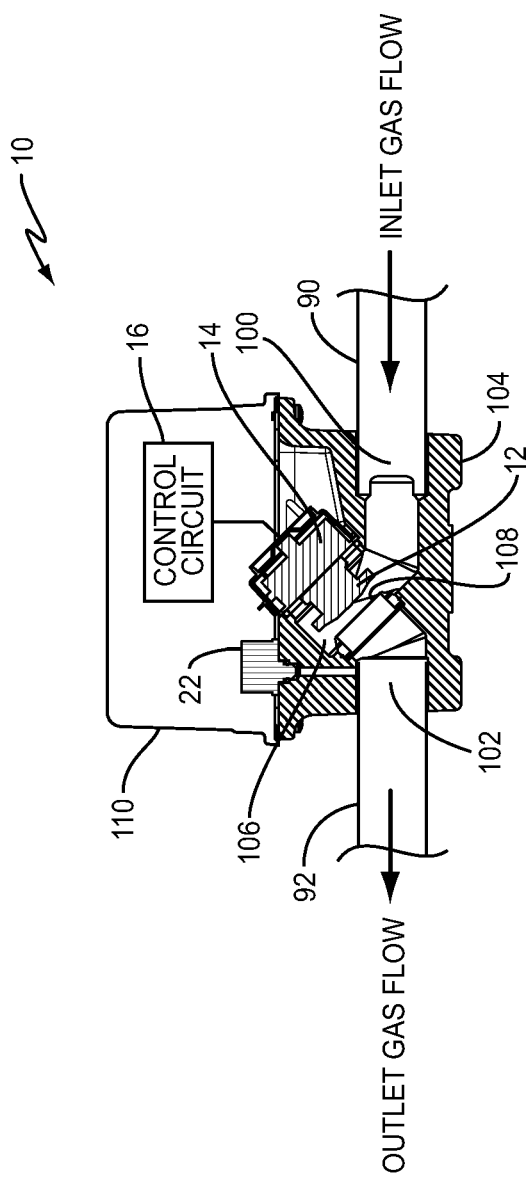
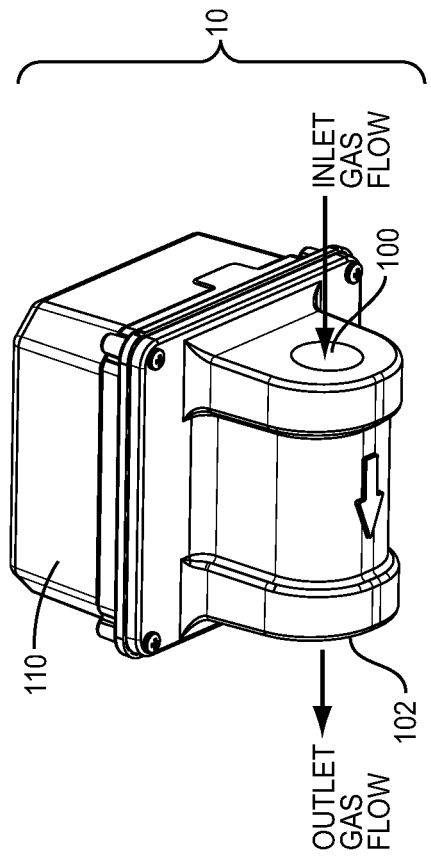
FIG. 8
FIG. 9

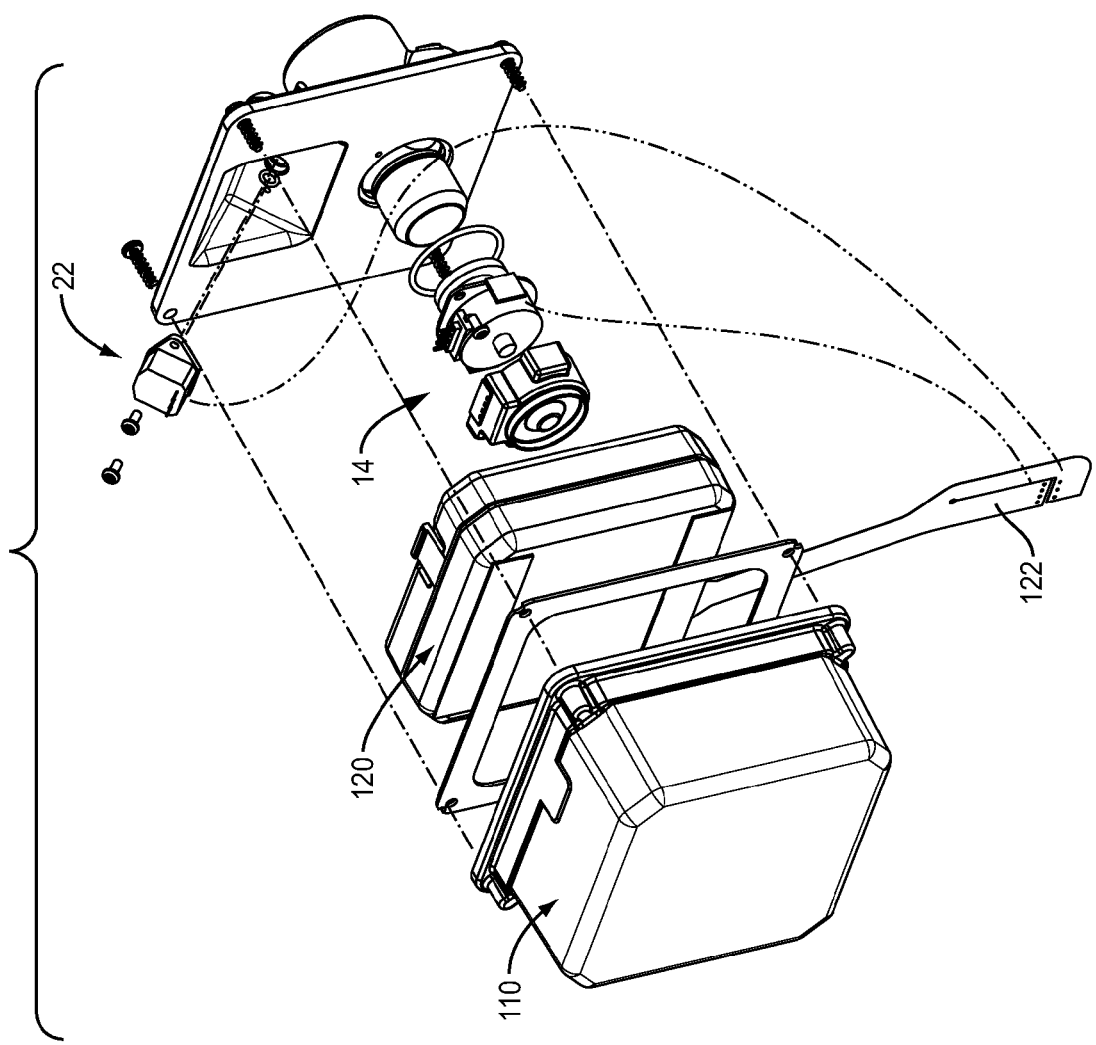

METHOD AND APPARATUS FOR CONTROLLING GAS FLOW VIA A GAS SHUT-OFF VALVE ASSEMBLY

RELATED APPLICATIONS

This application claims priority under 35 U.S.C. 120 as a continuation application of U.S. application Ser. No. 12/852,684, which has a filing date of 9 Aug. 2010.

FIELD OF THE INVENTION

The present invention generally relates to controlling gas flow, and particularly relates to a method and apparatus for controlling gas flow via a gas shut-off valve assembly, such as for use in a natural gas supply line.

BACKGROUND

Gas valves find ready use in the distribution and control of natural gas, propane, and fuel gas. Often such valves are used to allow or disallow gas to be drawn at individual distribution end-points, such as at residential or commercial buildings. Gas flow may be shut off because of safety concerns—e.g., leaks or supply line ruptures—or for other reasons, such as maintenance or billing issues.

Consequently, there are a number of known types of gas shut-off valves in use, including: manual shut-off valves, earthquake-sensitive shutoff valves, and excess-flow gas shutoff valves. See, e.g., *Final Report Seismic Gas Shutoff Devices Excess Flow Gas Shutoff Devices*, published in May 2004 by the California Housing and Community Development. The latter two types of gas shut-off valves in the preceding example list are types of automatic shut-off valves.

Further, there are a number of gas shut-off valves with some form of remote disconnect capability, either electrical or mechanical. Such valves may be integrated with the gas meter and, commonly, they rely for their operation on flow-rate sensing provided by the meter. There are known types of electronic valves that provide valve closure in response to locally or remotely generated RF commands. Other, more sophisticated examples include certain electronic valves manufactured by PANASONIC CORPORATION, for example. Such valves have met with success at least in the Japanese market.

However, providing for reliable long-term use of such valves in widespread distribution systems remains challenging. These challenges are particularly acute when one considers the harsher operating conditions associated with natural gas distribution in North America, and the increasing need for safe, low-maintenance or zero-maintenance installations.

SUMMARY

In one embodiment, the present invention comprises a method of controlling gas flow via a gas shut-off valve assembly. The method includes detecting a valve closure condition, and activating a motorized drive to move a valve from an open position to a closed position, in response to detecting the valve closure condition. In this regard, the valve is configured to permit gas flow when in the open position and to prevent gas flow when in the closed position, and the method further includes initially verifying valve closure, based on directly or indirectly detecting movement of the valve into the closed position. Still further, the method includes subsequently verifying valve closure, after the initial closure verification, based on monitoring gas pressure on a downstream side of the valve.

In another embodiment, the present invention comprises a gas shut-off valve assembly that includes a valve movable between an open position that permits gas flow through the gas shut-off valve assembly and a closed position that prevents gas flow through the gas shut-off valve assembly. The gas shut-off valve assembly further includes a motorized drive configured to move the valve between the open and closed positions, and a control circuit that includes or is associated with a pressure detection circuit and a valve position detection circuit. The control circuit is configured to close the valve via the motorized drive, in response to detecting a closure condition.

Further, the control circuit is configured to perform initial and subsequent verification of valve closure. In particular, in one or more embodiments, the control circuit is configured to initially verify valve closure based on directly or indirectly detecting movement of the valve into the closed position, and to subsequently verify valve closure—after initially verifying closure—based on monitoring gas pressure on a downstream side of the valve.

In yet another embodiment, the present invention comprises a method of controlling valve closure within a gas shut-off valve assembly in a manner that enhances service life and valve reliability. The method includes driving a valve closure motor to move a gas shut-off valve from an open position where it does not block a gas flow to a closed position where it blocks the gas flow. As part of said driving, the method includes detecting that said valve has moved to a near-closed position, in which the valve constricts but does not block the gas flow and thereby causes an elevated flow velocity. Movement of the valve toward the closed position is suspended or otherwise slowed, responsive to such detection. Doing so lengthens the time in which the gas flow experiences elevated flow velocity through the gas shut-off valve assembly and thereby promotes cleaning of a gas valve seating area within the gas shut-off valve assembly.

In yet another embodiment, the present invention comprises a method of controlling valve closure within a gas shut-off valve assembly in a manner that enhances service life and valve reliability. The method includes driving a valve positioning motor to move a gas shut-off valve from an open position where it does not block a gas flow to a closed position where it blocks the gas flow. As part of driving the valve, the method includes detecting a closure failure, wherein the valve is detected as failing to move to the closed position. The method further includes invoking a valve clearing routine responsive to detecting the closure failure. The valve clearing routine comprises attempting, via control of the valve positioning motor, to cycle the valve from the open position to the closed position, or to some intermediate position towards the closed position, a fixed number of times.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 8 is a cross-sectional diagram providing a partial side view of an embodiment of a gas shut-off valve assembly configured for horizontal mounting and operation.

FIG. 9 is a perspective view of the gas shut-off valve assembly shown in FIG. 8.

FIG. 12 is an exploded, partial view of another embodiment of a gas shut-off valve assembly.

DETAILED DESCRIPTION

Figure 1:
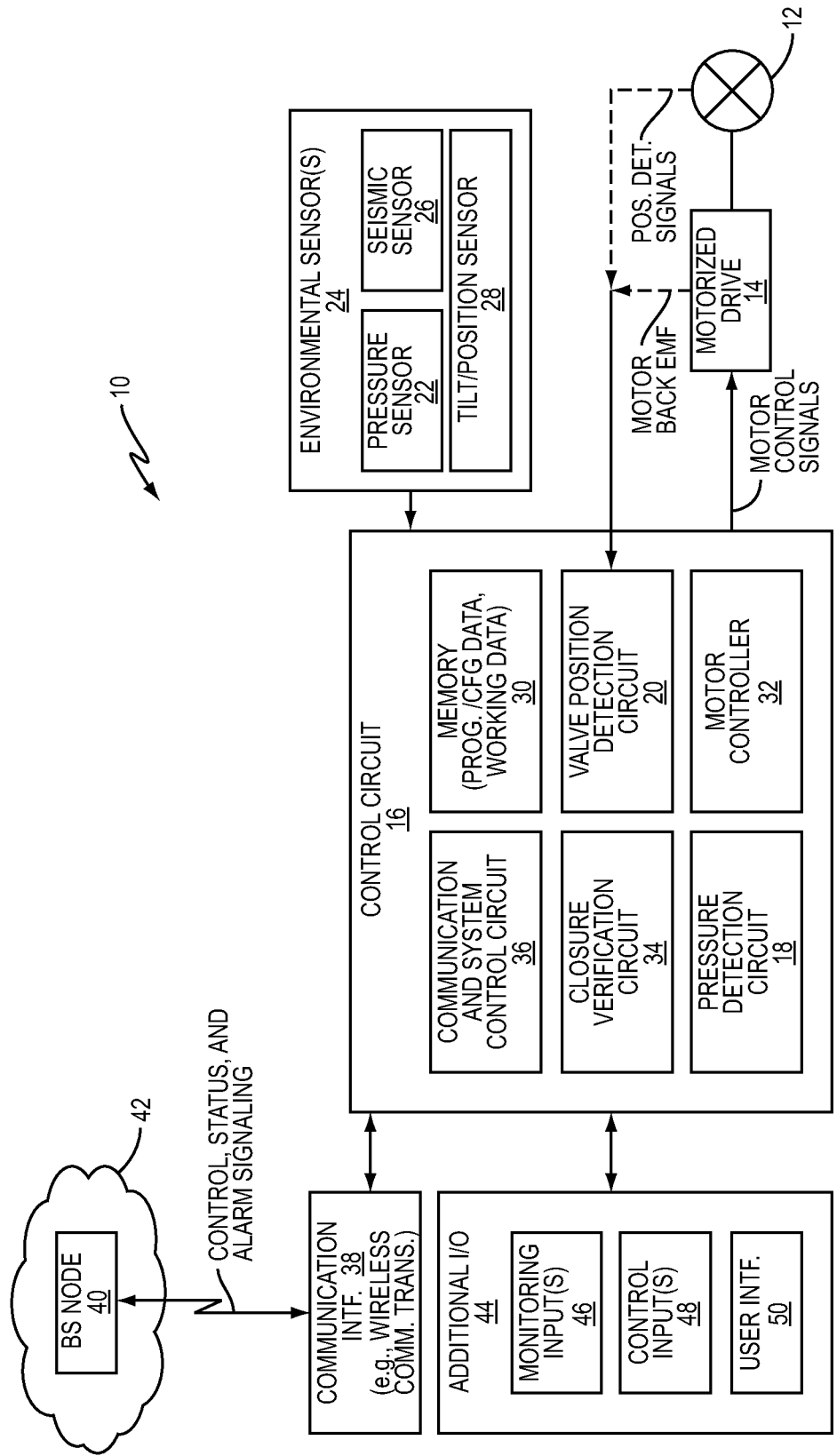
FIG. 1 is a block diagram of one embodiment of a gas shut-off valve assembly that is configured for operation as a communicatively-linked remote node within an Automated Meter Reading (AMR) network.

FIG. 1 illustrates an example embodiment of a gas shut-off valve assembly 10 as taught herein. As the following example details illustrate, the gas shut-off valve assembly 10 in one or more embodiments is configured as an intelligent, controllable node in an Automated Meter Reading (AMR) network, allowing remote (e.g., RF-based) monitoring of the assembly's valve status (e.g., open, closed, failed, etc.), remote control of valve positioning (e.g., remotely commanded valve opening, closing, testing, etc.), and remote monitoring of any one or more operating conditions of the gas shut-off valve assembly 10. In at least one such embodiment, the gas shut-off valve assembly 10 is configured to transmit alarm and/or other status signals, based on detecting its local operating conditions and operating state.

In the same or other embodiments, the gas shut-off valve assembly 10 includes advantageous autonomous, self-attended operating features. For example, in at least one embodiment, the gas shut-off valve assembly 10 provides significant safety-of-operation by autonomously detecting any one or more of a number of potentially unsafe operating conditions, and taking corresponding control action. For example, the gas shut-off valve assembly 10 automatically closes its included gas shut-off valve responsive to sensing seismic events, unsafe or abnormal gas pressures, movement from its nominal mounting orientation, etc.

With these possibilities and variations in mind, the gas shut-off valve assembly 10 of FIG. 1 includes a valve 12 that is movable between an open position that permits gas flow through the gas shut-off valve assembly 10, and a closed position that prevents gas flow through the gas shut-off valve assembly 10. The gas shut-off valve assembly 10 further includes a motorized drive 14 that is configured to move the valve 12 between the open and closed positions, and a control circuit 16 that includes or is associated with a pressure detection circuit 18 and a valve position detection circuit 20.

The pressure detection circuit 18 includes or is associated with a pressure sensor 22, for sensing gas pressure. The pressure sensor 22 is considered to be an "environmental" sensor, as it senses a parameter of the assembly's operating environment. In at least one embodiment, the gas shut-off valve assembly 10 includes a number of environmental sensors 24, such as a seismic activity/event detector 26 and a tilt/position sensor 28. Correspondingly, the control circuit 16 is configured to receive analog or digital signals from the various ones of the environmental sensors 24 and to respond accordingly.

Continuing with the illustrated example, the gas shut-off valve assembly 10 includes: memory 30, including program and working data memory; a motor controller 32, to control the motorized drive 14 for valve positioning; a closure verification circuit 34, to perform valve closure verifications; and a communication and system control circuit 36, to provide overall operating control and supervision of the gas shut-off valve assembly 10 and, optionally, to provide remote communications capability by interfacing with a cellular modem or other communication interface 38. For example, the gas shut-off valve assembly 10 communicates wirelessly with a base station (BS) 40 or other node within an AMR network 42.

Still further, the illustrated gas shut-off valve assembly 10 includes additional Input/Output (I/O) 44, including: one or more additional monitoring inputs 46, for monitoring additional sensor or status signals input to the gas shut-off valve assembly 10; one or more control inputs 48, for monitoring additional control/command signals input to the gas shut-off valve assembly 10; and a user interface 50, e.g., for indicating operational status, alarm conditions, etc. In at least one embodiment, the user interface 50 includes a low-power LCD display and/or one or more lights or other visible indicators, to indicate operational status and/or provide troubleshooting or control instructions to a user.

Of course, it should be understood that one or more of these illustrated elements are optional, and the present invention contemplates embodiments of the gas shut-off valve assembly 10 that omit at least some of the illustrated elements, and embodiments that provide other elements not shown in FIG. 1. More generally, it will be understood that the implementation of the gas shut-off valve assembly 10 is subject to significant design variation, without departing from the core features and capabilities representing the focus of this disclosure. This point is particularly true with respect to the assembly's electronics.

In this regard, the control circuit 16 in one or more embodiments comprises one or more digital processing circuits that are configured to process the various environmental sensor and other inputs to the control circuit 16, and to provide corresponding valve control signals, along with various other outputs. The present invention contemplates a number of implementations for the control circuit 16, including fixed hardware, programmed hardware, or any combination thereof. As an example, the control circuit 16 comprises one or more Field Programmable Gate Arrays (FPGAs) or Complex Programmable Devices (CPLDs), or one or more microprocessor/microcontroller-based circuits, which may be integrated into a larger circuit implementation—such as in an ASIC or other custom chip.

In at least one embodiment, the control circuit 16 is advantageously based on a low-power microcontroller, offering high levels of integration for peripheral interfacing and control. For example, the control circuit 16 is based on an "MSP430F5437" or other MSP430F5 Series microcontroller from TEXAS INSTRUMENTS. The '5437 device is a 16-bit, RISC-based microcontroller offering low power operation at supply voltages of 2.2 VDC to 3.6 VDC (e.g., operation at <500 μA). The low-power/low-voltage operation provides for long operating life from, e.g., a single D-cell battery.

As a further advantage, the '5437 device offers on-board program and data memory (e.g., FLASH and SRAM), along with an integrated, multi-channel 12-bit analog-to-digital converter (ADC), a host of high-resolution hardware timers—e.g., for PWM and/or other precision control signaling, such as stepper motor control—and various I/O ports, including serial and discrete-bit ports. Of course, those of ordinary skill in the art will appreciate that other makes and models of microprocessors or other digital processing circuits may be used, in dependence on the particular design requirements at issue.

Returning to the illustrated example, the control circuit 16 includes the previously mentioned memory 30. The illustrated memory comprises, for example, FLASH or EEPROM for storing computer program instructions. When executed by the control circuit 16, these program instructions configure the control circuit 16 according to the teachings herein. As noted, the memory 30 also includes one or more other memory devices or memory types, such as SRAM for storing working data.

Working data includes motor control and valve positioning variables, such as used by the motor controller 32 for activating and otherwise controlling the motorized drive 14—which is also referred to as a "valve positioning motor," because the control circuit 16 opens and closes the valve based on its generation of motor control signals that are applied to the motorized drive 14.

Correspondingly, the control circuit 16 includes a closure verification circuit 34, which is described in more detail later. However, in broad terms, the closure verification circuit 34 is configured to provide a two-stage closure verification. With two-stage closure verification, a commanded closure of the valve 12 is initially verified by detecting (directly or indirectly) movement of the valve 12 into its closed position. That closure is subsequently verified based on monitoring downstream gas pressure over time (e.g., via the pressure detection circuit 18/pressure sensor 22). Thus, performing subsequent closure verification can be understood as confirming that the initial closure detection was correct, which is especially valuable in embodiments that use indirect or inferential sensing of valve position, and confirming that the valve 12 remains closed.

Figure 2:
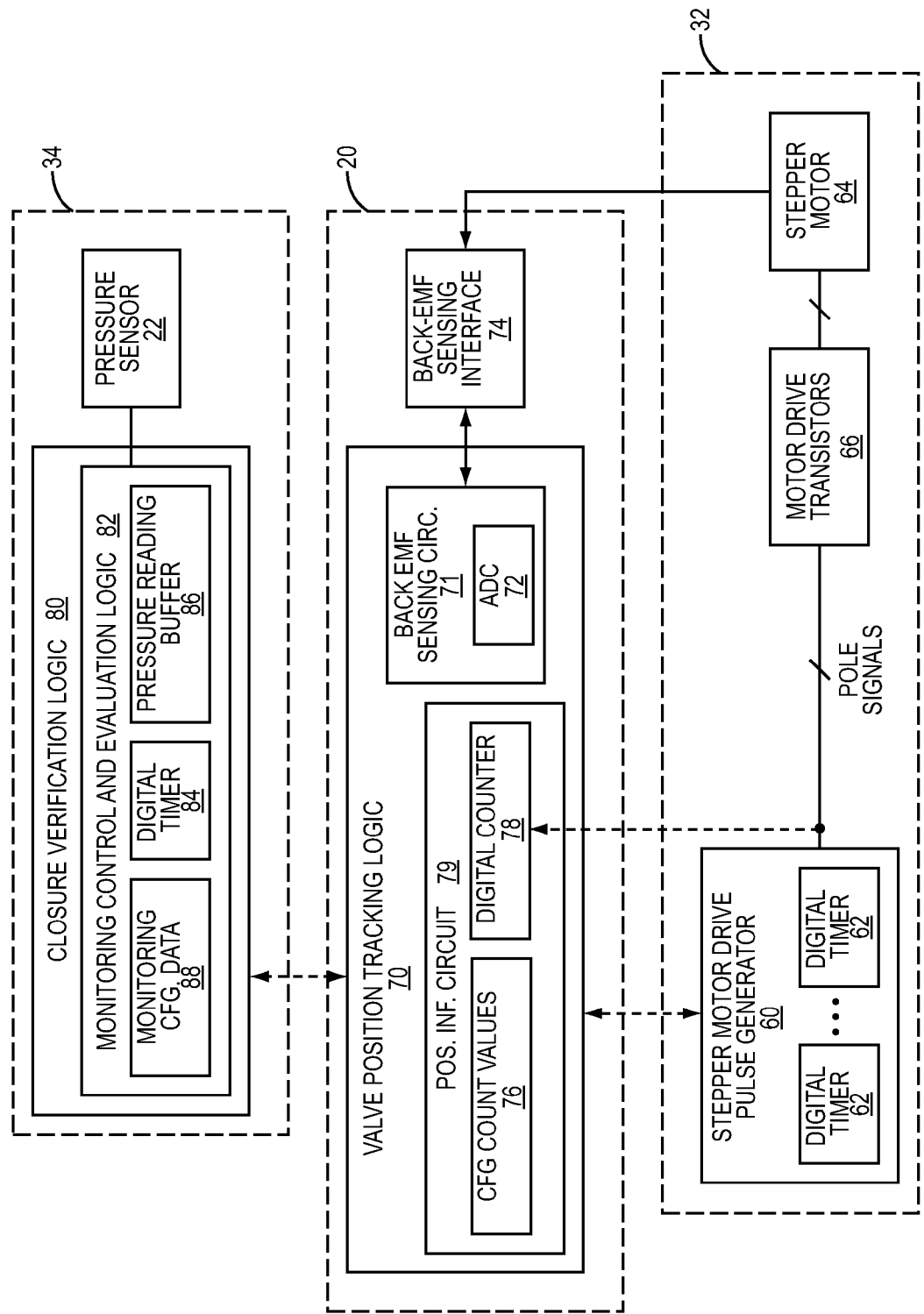
FIG. 2 is a block diagram of example circuit implementations for elements of a control circuit, such as may be included in the gas shut-off valve assembly of FIG. 1.

In one or more embodiments, the valve position detection circuit 20, the motor controller 32, and the closure verification circuit 34, are at least partly implemented as functional circuits within the control circuit 16 at large. For example, these circuits are realized at least partially through the particular configuration of a digital processor, based on executing particular computer program instructions. FIG. 2 provides corresponding example embodiments.

In FIG. 2, the motor controller 32 comprises a stepper motor drive pulse generator 60 (e.g., for multi-pole signal generation), which may comprise a program-logic configured functional circuit within a microcontroller, and which may use one or more hardware and/or software-based digital timers 62, for pulse timing and control. The stepper motor pulse generator 60 may be configured for full and/or half-stepping control, and, in the illustrated example, interfaces to a stepper motor 64 via motor drive transistors 66.

In turn, the valve position detection circuit 20 comprises valve position tracking logic 70, which, again, may be a microprocessor-based functional circuit which includes or uses one or more channels of an ADC 72 to sense back EMF from the stepper motor 64 through a back EMF sensing interface 74 (which includes, e.g., amplifiers, filters, level-shifters). The valve position tracking logic 70 further includes or is associated with configuration memory storing count values 76 (which may be ranges) that are associated with the open and closed positions of the valve 12 (and possibly with one or more intermediate positions used in self-testing routines, for example).

The valve position tracking logic 70 thus includes a back EMF sensing circuit 71, which uses the ADC 72 to sense the voltage level of back EMF from the stepper motor 64, as the stepper motor 64 is being driven by the motor controller 32. It further includes a position inferring circuit 79, which uses the digital counter 78 to count the stepping pulses applied to the stepper motor 64. Taking a known or assumed starting position, e.g., a full-open position of the valve 12, the position inferring circuit 79 tracks movement of the valve 12 based on counting the stepping pulses that are applied to the stepper motor 64, to move the valve 12 from that known or assumed starting position. That counting is done in conjunction with monitoring back EMF via the back EMF sensing circuit 71, to detect a characteristic drop in back EMF, which indicates a stall condition of the stepper motor 64. Accordingly, the position inferring circuit 79 determines whether stalls of the stepper motor 64 occur at stepping counts associated with full-open and full-closed positions of the valve 12.

In at least one embodiment, the back EMF of the stepper motor 64 is advantageously detected from one or more unused poles of the stepper motor 64. The observed voltage experiences a substantial, characteristic decrease—e.g., a drop from a voltage at or about the driving voltage, to at or about zero (relative to whatever drive voltage reference is being used). This behavior allows the valve position detection circuit 20 to correlate observed changes in back EMF with stepping counts, to detect whether the valve 12 halts before reaching one of its full-travel positions (closed or open). Of course, one or more intermediate valve positions may be detected, such as by including their corresponding count values in the data structure comprising the configured count values 76.

More broadly, in one or more embodiments, the motorized drive 14 includes a stepper motor 64, and the control circuit 16 is configured to generate stepper motor control signals, for moving the valve 12 between the open and closed positions. Further, the valve position detection circuit 20 comprises a counting circuit 78 to count stepper motor signal pulses applied to the stepper motor 64 by the control circuit 16, a back EMF sensing circuit 71, to sense a back EMF of the stepper motor 64, and a position inferring circuit 79, configured to infer the position of the valve 12, based on counting stepper motor pulses applied to the stepper motor 64 in conjunction with sensing characteristic changes in the back EMF of the stepper motor 64 at count ranges that are associated with the open and closed positions of the valve 12. As noted, in at least one such embodiment, the control circuit 16 comprises a microprocessor that includes at least the counting circuit 78 and the position inferring circuit 79 of the valve position detection circuit 20.

Of course, the particular back EMF sensing approach is subject to variation, depending on motor type and circuit implementation. For example, in one variation, it is contemplated herein to use a brushless DC motor to drive the valve 12, instead of a stepper motor. As a further variation, the valve position detection circuit 20 may include or otherwise be associated with one or more sensors, for directly detecting valve position.

As one example, a rotary encoder or photo-interrupter is directly coupled to the motorized drive 14, and feedback from such a device is taken as positive indication of valve movement. Alternatively, one or more proximity sensors are used—e.g., magnetic or capacitive—are used to detect valve position. As a further alternative, contact or pressure sensors are disposed in or at valve seating areas within the gas shut-off valve assembly 10, to positively detect the valve 12 in its open and closed positions.

Regardless of these implementation details, the valve position detection circuit 20 provides the closure verification circuit 34 with a logical indication or other signaling indicating detected valve positions, and particularly provides signaling indicating failures of the valve 12 to move into the open or closed positions (or into another commanded position). This signaling, in combination with pressure sensing from the pressure sensor 22, allows the closure verification logic 80 of the closure verification circuit 34 to perform initial and subsequent closure verifications.

For example, included monitoring control and evaluation logic 82 performs initial closure verification based on receiving a closure failure indication from the valve position detection circuit 20—e.g., an indication of whether the valve 12 was or was not detected as reaching its closed position—and performs subsequent closure verification based on monitoring gas pressure over time. In this regard, the closure verification circuit 34 may use a digital timer 84 to take periodic or other timed gas pressure readings, which are accumulated, e.g., in a buffer 86. (In one embodiment, more than one pressure reading is taken at a given measurement time, to produce a filtered pressure reading.)

The monitoring control and evaluation logic 82 correspondingly performs subsequent valve closure verification—i.e., the verification done after initial closure is detected. This subsequent closure verification is based on monitoring gas pressure over time. For example, in one embodiment, the subsequent closure verification is based on detecting changes in the gas pressure readings. For example, stable low pressure readings or declining pressure readings are taken as evidence that the valve 12 closed as initially detected, and remains closed.

As another example, the subsequent closure verification is based on observing the gas pressure behavior after the initial closure verification, to determine whether the observed behavior deviates from an expected post-valve-closure behavior. For example, monitoring configuration data 88 may include data representing an expected pressure profile, against which the observed gas pressure behavior is compared. The numeric data comprising the expected pressure profile corresponds to an expected pressure decay profile in one embodiment.

With the examples immediately above in mind, it will be understood that the controller 16 is configured to initially verify valve closure based on directly or indirectly detecting movement of the valve 12 into the closed position, and to subsequently verify valve closure based on monitoring gas pressure on a downstream side of the valve 12. This subsequent verification is performed after initial verification of valve closure. However, in addition to the contemplated variations in how valve closure is verified, this disclosure presents a number of contemplated bases and configurations for the gas shut-off valve assembly 10 to perform valve closure.

Broadly, in one or more embodiments, the control circuit 16 is configured to close the valve 12 via the motorized drive 14, in response to detecting a "closure condition." As used herein, the term "closure condition" is a condition or instance for which the valve 12 should be moved into its closed position (or left in its closed position). As one example, receiving a valve closure command via the communication interface 38 is determined by the control circuit 16 to be a closure condition. That is, the control circuit 16 is configured to interpret receipt of a valve closure command via the communication interface 38 as a closure condition, to thereby trigger valve closure.

Further, the gas shut-off valve assembly 10 in one or more embodiments uses its communication interface 38 to send alarm and status signaling. In at least one such embodiment, the control circuit 16 is configured to send an alarm signal via the communication interface 38, e.g., via RF signaling that is transmitted from a cellular or other wireless transceiver of the communication interface 38. In particular, the control circuit 16 sends alarms in response to at least one of detecting an initial or subsequent closure verification failure, indicating that the valve is not fully closed.

In at least one such embodiment, the control circuit 16 is configured to communicate via a wireless communication transceiver as an intelligent node in the illustrated AMR network 42. Here, the control circuit 16 is configured to detect the position of the valve 12 and send a corresponding valve position message, either as a self-initiated outgoing message, or in response to a status request message. Further, the control circuit 16 in this embodiment is configured to receive a valve positioning command (from the AMR network 42) and position the valve 12 responsive thereto.

These capabilities permit remote valve status monitoring, remote testing of the gas shut-off valve assembly 10, and the ability to implement commanded opening and closing of the gas shut-off valve assembly 10 within the command and control structure of the AMR network 42. It will be understood that the control circuit 16 in one or more such embodiments implements a communication protocol, e.g., an IP-based messaging protocol, based on the OSI network model, for example. Unique numbering of the gas shut-off valve assembly 10, e.g., via stored electronic serial numbers or the like, permit the gas shut-off valve assembly 10 to detect whether a given message is addressed to it or another gas shut-off valve assembly 10. Address masking or special identifiers also may be used, to configure messages for broadcasting to multiple gas shut-off valve assemblies 10.

Even in embodiments where the gas shut-off valve assembly 10 is integrated into an AMR network, the gas shut-off valve assembly 10 may be configured with autonomous behaviors that significantly enhance its safety-of-operation and flexibility. For example, each of the one or more environmental sensors 24 is configured to assert an unsafe operating conditions signal, and the control circuit 16 is configured to interpret the assertion of any one of the unsafe operating conditions signals as a closure condition, to thereby trigger valve closure. Example unsafe conditions include one or more of the following: excessively high or low gas pressure, which can be detected by comparing measured gas pressure against configured pressure thresholds; the occurrence of a seismic event or ongoing seismic activity, as indicated by the seismic sensor 26; and the movement or detected change in orientation of the gas shut-off valve assembly 10 from its nominal installation orientation, as detected by the tilt/position sensor 28.

Figure 3:
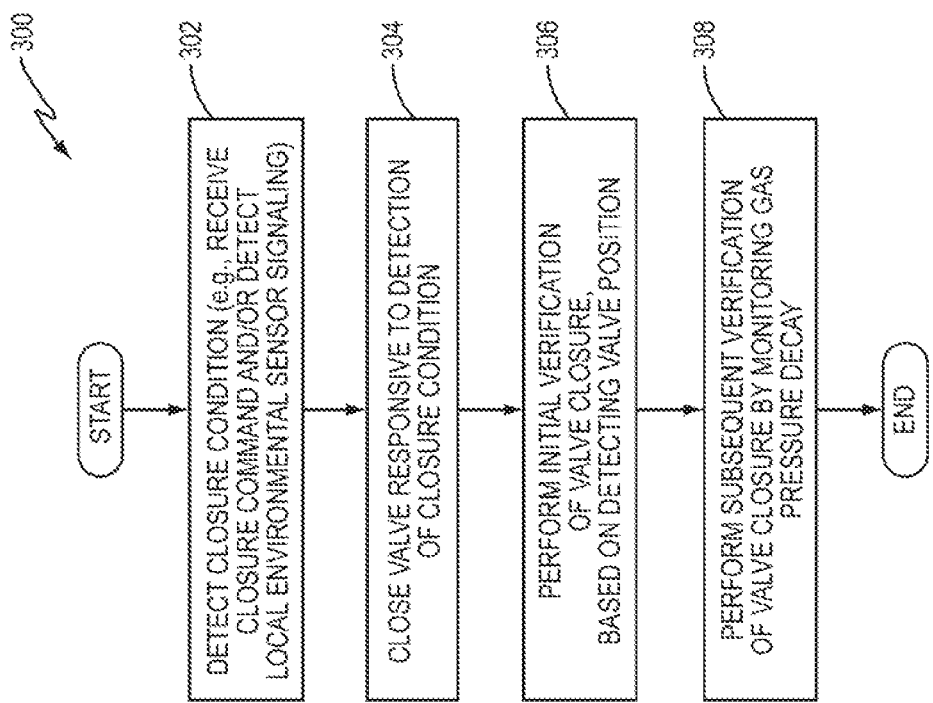
FIG. 3 is a logic flow diagram of one embodiment of a method of controlling gas flow via a gas shut-off valve assembly.

An example method of operation along these lines appears in the logic flow diagram of FIG. 3. In particular, FIG. 3 depicts a method 300 of controlling gas flow via a gas shut-off valve assembly 10, where the method includes detecting a valve closure condition (Block 302), and activating a motorized drive 14 to move a valve 12 from an open position to a closed position, in response to detecting the valve closure condition (Block 304). The method further includes initially verifying valve closure, based on directly or indirectly detecting movement of the valve into the closed position (Block 306), and subsequently verifying valve closure, based on monitoring gas pressure on a downstream side of the valve 12, subsequent to the initial verification of valve closure (Block 308).

Figure 4:
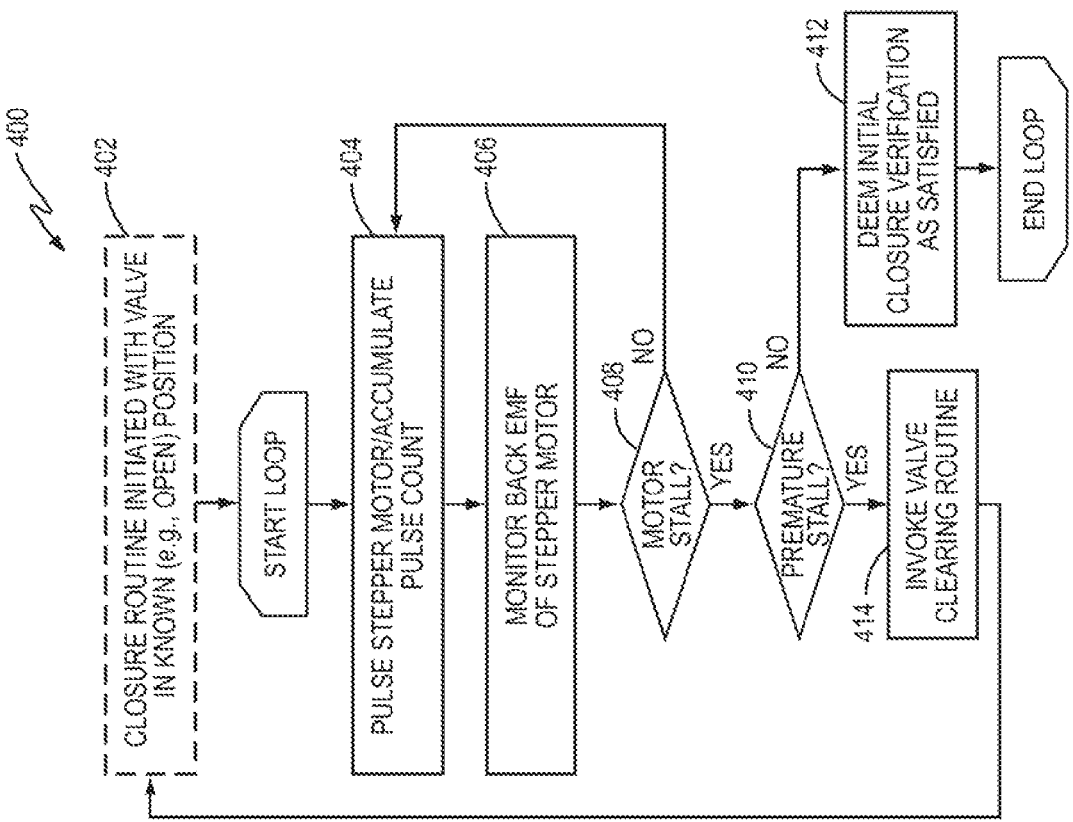
FIG. 4 is a logic flow diagram of one embodiment of a method indirectly detecting the position or movement of a gas shut-off valve, such as for detecting valve movement from an open position to a closed position within a gas shut-off valve assembly.

The initial valve closure verification may include one or more advantageous added methods, such as a valve clearing routine that is initiated responsive to detecting a valve closure failure. FIG. 4 illustrates one example method 400 of incorporating a valve clearing routine into valve closure operations carried out by the control circuit 16.

A starting assumption is that inferential valve position detection is being used, and the closure routine starts with the valve 12 in a known position (Block 402), e.g., the open position. The control circuit 16 activates the motorized drive 14, to begin driving the valve 12 towards the closed position, and it accumulates (counts) the applied stepper motor pulses (Block 404). It will be appreciated in this regard that the control circuit 16 stores count values (e.g., configured count values 76, as shown in FIG. 2) that correspond to the closed position. For example, the control circuit stores an integer number representing the number of counts needed to move the valve 12 from the open position (full-open) to the closed position (full-closed).

In one embodiment, such count values are pre-stored in memory 30 of the control circuit 16, during manufacturing for example. To enhance flexibility, the memory 30 may store different sets of pre-configured count values, corresponding to different motor types, different motorized drives 14, and/or different valve configurations. Circuit board jumpers, switches, or software flags are used, to set which count values are used by the control circuit 16, allowing the same control circuit 16 to be used in various models or styles of the gas shut-off valve assembly 10. Additionally, or alternatively, the control circuit 16 is configured to learn the pulse counts associated with the closed and/or open positions, such as by performing one or more "calibration" cycles, wherein it monitors back EMF as it drives the stepper motor 64 in each of the open and closed directions until it senses a motor stall.

Returning to the illustrated method, one sees that the control circuit 16 monitors the back EMF of the stepper motor 64 (Block 406), while the motorized drive 14 moves the valve 12 toward the closed position. As part of this process, the control circuit 16 monitors for motor stall (Block 408). Such monitoring continues in conjunction with pulse count accumulation, until motor stall is detected (YES, from Block 408).

Upon detecting motor stall, the control circuit 16 determines whether the stall is premature (Block 410). For example, the control circuit 16 compares the accumulated pulse count to a preconfigured count value, and determines whether the two counts are equal. (Here, it will be understood that the comparison may include a "tolerance," meaning that the accumulated count will be deemed to match the "closed" count value if it is within a defined count range of the closed count value.)

If the stall count matches the closed count (NO, from Block 410), the control circuit 16 deems the valve 12 to be in its closed position and, therefore, deems the initial closure verification to be satisfied (Block 412). (Here, "stall" count means the pulse count accumulated up to the point that motor stall was detected.) Conversely, if the stall count is less than closed count (YES, from Block 410), the control circuit 16 deems the stall to be premature, and from that infers that the valve 12 did not reach the closed position.

Figure 5:
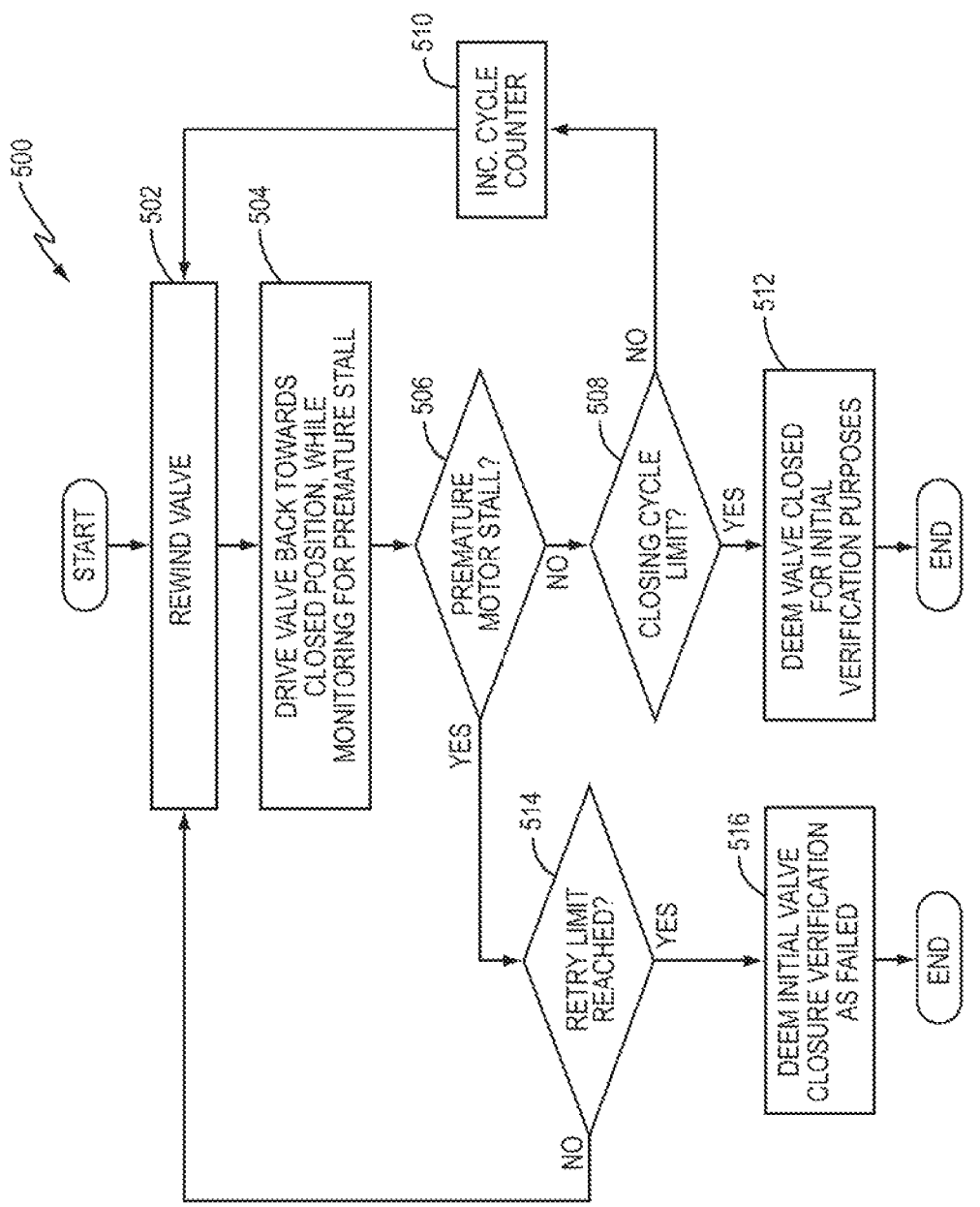
FIG. 5 is a logic flow diagram of one embodiment of a method of valve positioning motor control, including the selective invocation of a valve clearing routine.

In response to that determination, the control circuit 16 invokes a valve clearing routine (Block 414). An example valve clearing routine is shown as method 500 in FIG. 5. The illustrated processing assumes that the valve clearing routine has been invoked, e.g., through Block 414 of FIG. 4. Processing thus begins with "rewinding" the valve 12 (Block 502). Here, rewinding the valve 12 comprises reversing the motorized drive 14 and driving the valve 12 back toward the open position. The control circuit 16 may decrement the stepper motor counts it had accumulated at the point of detecting motor stall as the motorized drive 14 is rewound, such that a motor stall coinciding with a zero count or other value is detected as reaching the open position. (Of course, the routine may be modified, such that the control circuit 16 rewinds the valve 12 to some intermediate position between open and closed.)

Regardless, once the valve 12 has been rewound, the control circuit 16 begins driving the valve 12 back towards the closed position, while monitoring for premature motor stall (Block 504). If another premature stall is not detected (NO, from Block 506), the control circuit 16 deems the valve 12 to have reached the closed position. However, in one or more embodiments, the valve clearing routine is configured to repeat the rewinding/re-closing operations more than once, to promote clearing of any debris or valve "sticking" that might have caused the premature stall that caused the valve clearing routine to be invoked.

Thus, in at least one embodiment, there is a pre-configured or dynamically determined "cycle count" value that indicates the number of rewind/re-closing cycles to carry out within the valve clearing routine. The control circuit 16 therefore checks whether this closing cycle limit has been reached. If not, (NO, from Block 508), the control circuit 16 increments the cycle counter (Block 510) and repeats the processing of Blocks 502, 504, 506, and 508. In at least one embodiment, the valve clearing routine uses a cycle count of two (2) or greater, meaning that the valve clearing routine performs two or more closing cycles, responsive to detecting premature motor stall during an initial valve closure operation.

If premature stall is again detected (YES, from Block 506), the control circuit 16 checks whether the retry limit has been reached (Block 514). If so, the control circuit 16 deems the initial closure verification to have failed (Block 516). If not, the control circuit 16 repeats its rewind processing (Block 502, etc.). The retry limit is an integer value of one or greater, and preferably is between two and four, meaning that between two and four retries are attempted before declaring an initial closure verification failure.

Conversely, if no premature stall is detected (NO, from Block 506), and if the closing cycle count limit has been reached (YES, from Block 508), the control circuit 16 deems the valve 12 to be closed, for initial verification purposes (Block 512). In terms of logical states, then, the control circuit 16 would then transition to subsequent closure verification processing (e.g., pressure monitoring), which may be done in conjunction with other monitoring, control, and communications operations.

Figure 6:
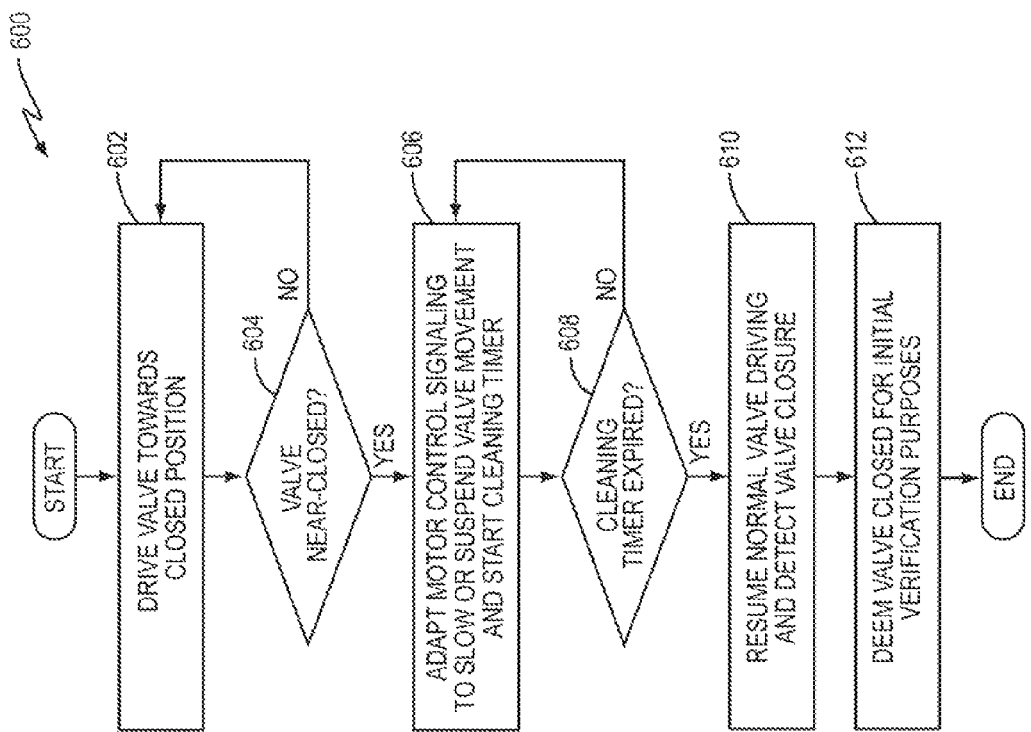
FIG. 6 is a logic flow diagram of one embodiment of a method of valve positioning motor control, including the selective invocation of a valve cleaning routine.

The valve clearing routine will be understood to offer a number of practical advantages, including promoting the safety and reliability of the gas shut-off valve assembly 10 in the field. FIG. 6 illustrates another such method, which is incorporated into the operational configuration of the control circuit 16 in one or more embodiments. In particular, FIG. 6 depicts a valve cleaning routine that may be included in the operating logic of the control circuit 16 in addition to the routine depicted in FIG. 5, or as an alternative to that routine.

The method 600 may be invoked by the control circuit 16 as part of its normal valve closure operations, e.g., performed every time the control circuit 16 closes the valve 12 for any reason. Of course, the control circuit 16 also may be configured to perform the method 600 as part of self-testing or self-maintenance routines, or in response to receiving remote or local commands.

Regardless, the method 600 begins with driving the valve 12 towards the closed position (Block 602). This driving operation will be understood to include the premature stall monitoring, etc., disclosed earlier herein. As part of that driving, the control circuit 16 detects that the valve 12 has moved to a near-closed position, in which the valve 12 constricts but does not block the gas flow and thereby causes an elevated flow velocity. That is, the control circuit 16 controls the motorized drive 14, to drive the valve 12 toward the closed position and monitors valve position while doing so.

When the control circuit 16 detects that the valve 12 has reached a defined, near-closed position (YES, from Block 604), it adapts its motor control signaling, to suspend movement of the valve 12, or otherwise to slow down the valve's rate of movement toward the closed position (Block 606). In conjunction with stopping or slowing down the valve 12, the control circuit 16 may start a "cleaning timer."

It will be appreciated that the near-closed position can be detected using direct sensors, such as capacitive or other proximity sensors, or it can be detected inferentially, such as by detecting that the accumulated count of motor pulses is at, say, 90% of the count value corresponding to the closed position. However the near-closed position is detected, the control circuit 16 is configured to stop or slow down the valve 12, to lengthen the time in which the gas flow experiences elevated flow velocity through the gas shut-off valve assembly 10. Doing so promotes cleaning of the gas valve seating area within the gas shut-off valve assembly 10.

In this sense, the near-closed position can be empirically determined, e.g., as part of the design process for a given make and model of the gas valve shut-off assembly 10, and that number can be programmed into non-volatile memory of the gas shut-off valve assembly 10 during manufacturing. In another embodiment, the near-closed position, may be dynamically determined, such as by sensing the actual flow velocity (directly or indirectly). Regardless of the mechanism used to set or otherwise define the near-closed position, it will be understood that the method 600 produces an extended time during which the valve 12 constricts the flow of gas through the gas shut-off valve assembly 10. That extended time of high-velocity gas flow promotes cleaning of the valve seating area within the gas shut-off valve assembly, and, for example, can sweep away particulate matter or other contaminants that may have accumulated in the gas valve shut-off assembly 10.

Returning to the method 600, after expiration of the cleaning timer (YES, from Block 608), one sees that the control circuit 16 resumes normal driving of the valve 12 towards the closed position (Block 610). For simplicity, the premature stall monitoring and potential valve clearing routine invocations are not shown in Block 610, and it is assumed for illustration purposes that the control circuit 16 is able to successfully complete movement of the valve 12 into the closed position. Thus, the method concludes with deeming the valve 12 closed, for purposes of initial closure verification (Block 612). However, if the cleaning method 600 was invoked as part of a periodic maintenance and test routine implemented by the control circuit 16, it will be understood that the control circuit 16 may return the valve 12 to its open position, for normal gas-flow operations. (In one variation of this routine, the valve 12 is returned to the open position, without completing the closing cycle. That is, the valve 12 is moved to the near-closed position, held there for a defined time, and then the valve 12 is moved back to the open position.)

Thus, the gas shut-off valve assembly 10 is, in one or more embodiments, configured to enhance its reliability and safety of operation, based on incorporating one or more valve clearing/cleaning routines into its operations. Such operations help promote reliable valve closure. Particularly, the control circuit 16 in one or more embodiments is configured to retry valve closure one or more times, responsive to determining the valve closure status as not closed. Retrying valve closure includes re-activating the motorized drive 14, such as by fully or partially rewinding to the open position of the valve 12 and then driving toward the closed position.

Figure 7:
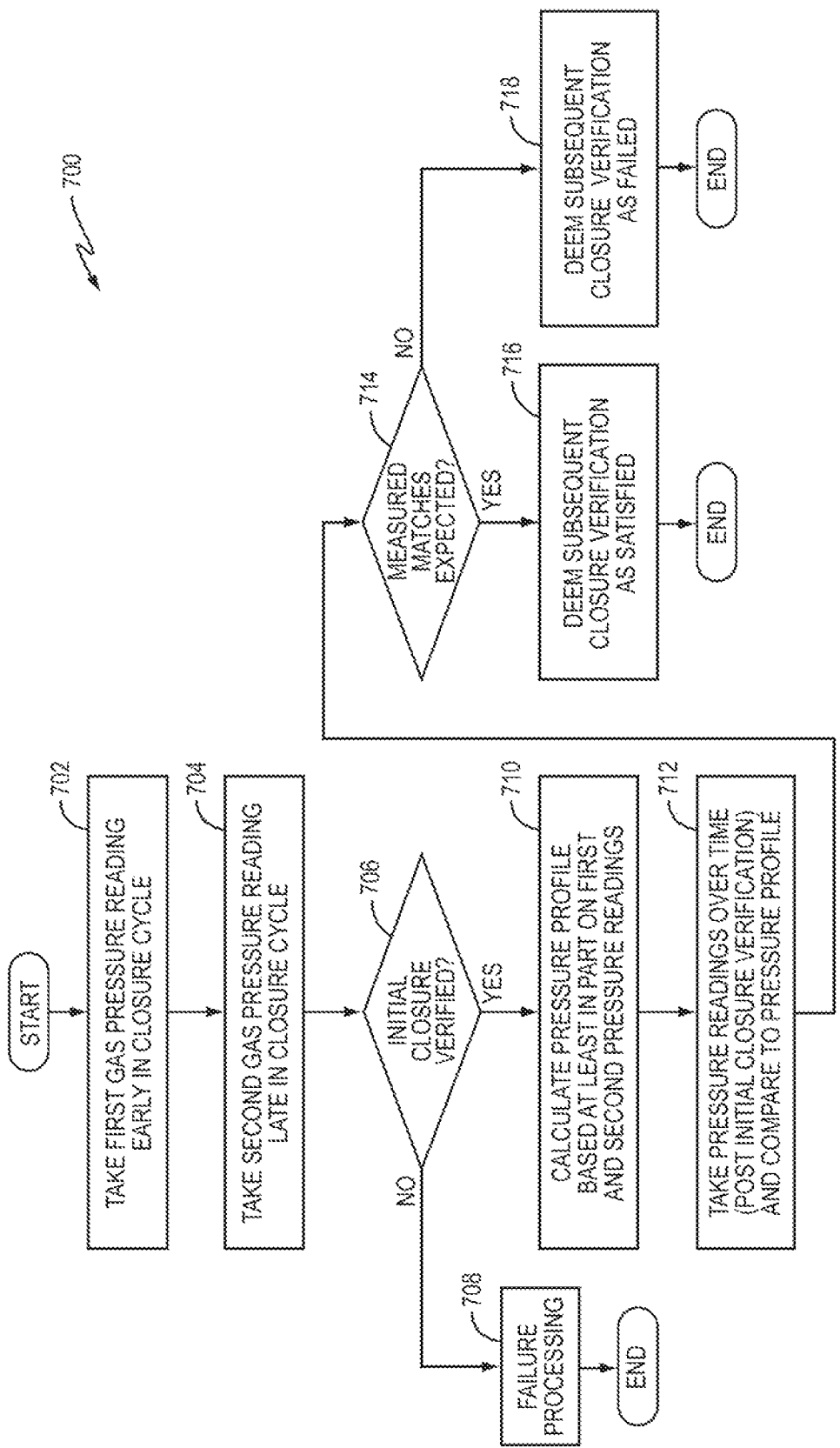
FIG. 7 is a logic flow diagram of one embodiment of a method of verifying valve closure, based on pressure monitoring.

However, with or without the incorporation of cleaning routines, the gas shut-off valve assembly's control circuit 16 is advantageously configured to measure gas pressure at different times and evaluate the measured gas pressure over time, to determine a valve closure status as closed or not closed. FIG. 7 illustrates a particular embodiment of subsequent closure verification. The depicted method 700 assumes that the control circuit 16 has detected a closure condition and thus has begun closing the valve 12, or at least entered into valve closure operations. In conjunction with such operations, the method 700 includes taking a first gas pressure reading early in the valve closure cycle (Block 702). Here, "early" means taking a reading either before beginning the actual driving of the valve 12 towards the closed position, or taking the reading during the initial portion of the valve's travel towards the closed position (e.g., at less than ten or fifteen percent closed).

The control circuit 16 continues driving the valve 12 towards the closed position and the method 700 continues with taking a second gas pressure reading late in the closure cycle (Block 704). As an example, the pressure reading is taken at the ninety-percent closed position, and it may be taken in conjunction with the valve cleaning method 600 described earlier. The control circuit 16 then either continues or resumes driving the valve 12 towards the closed position, for initial valve closure verification.

If initial closure is not verified (NO, from Block 706), the control circuit 16 carries out failure processing (Block 708). Such processing includes, for example, logging the event with time stamping and/or outputting a local alarm signal or transmitting an alarm signal to the AMR network 42. On the other hand, if initial closure is verified (YES, from Block 706), the method 700 continues with the control circuit calculating a pressure profile based at least on the first and second gas pressure readings—i.e., the early and late readings (Block 710). The pressure profile may be understood as an "expected" pressure behavior for the downstream gas pressure, based on the assumption that the valve 12 is properly closed. As such, the control circuit 16 may consider one or more additional data items in its pressure profile calculation. For example, it may use pre-configured values representing known downstream "system" volumes and/or configured or dynamically determined gas flow rates, to compute the pressure profile as a projection of the gas pressure changes that would be expected after actual closure of the valve 12. With the pressure profile thus computed, the control circuit 16 performs subsequent closure verification by taking pressure readings over time and comparing those pressure readings with the pressure profile (Block 712).

To the extent that the observed downstream gas pressure substantially conforms to the pressure profile (YES, from Block 714), the control circuit 16 deems subsequent closure verification to have passed (Block 716). However, if the observed and expected pressure behaviors do not match, the control circuit 16 deems the subsequent closure verification to have failed (Block 718), and generates alarm signaling and/or undertakes other programmed failure processing. It will be understood in this regard that subsequent closure verification may be an ongoing process, or otherwise be repeated over time, to ensure that the valve 12 remains closed.

Thus, in at least one embodiment, the gas shut-off valve assembly 10 is configured to bolster its safety and intelligence by providing for further verification of proper valve closure, beyond the initial closure verification. It does so by taking gas pressure readings over time, to determine the valve closure status as "closed" or "not closed." The closed/not-closed status condition may be represented as a logical variable within the working and/or data logging memory of the control circuit 16. In a particular embodiment, the control circuit 16 provides further valve closure verification by taking gas pressure sensor readings: (1) before or at the beginning of closing; (2) at a pre-determined valve position a short distance away from the expected, unimpeded closing of the valve 12; and (3) at multiple time instances after full-closed motor stall. The first two pressure readings serve as a "virtual inlet pressure" and a "virtual differential pressure," respectively.

The control circuit 16 uses these virtual pressures in an algorithm to estimate the gas consumption rate of flow with the valve 12 near the orifice seat, where a predicted flow coefficient can be used. The estimated gas flow rate, from the "virtual" pressures, and an estimate of system volume, are used in an algorithm to determine the expected rate of pressure decay. Comparison with the measured rate of pressure changes, following the full closure of the valve 12 allows for yet another level of assurance that the valve 12 is closed and leak-free.

Further, the resultant valve position and success/failure status of the valve position change are recorded in memory by the control circuit 16. Depending on operational mode, the control circuit 16 initiates transmission of a successful valve position change and status or an alarm message if the valve 12 failed to reach its intended position. Such signaling is sent, for example, as intelligent signaling in the AMR network 42, which may be a SENSUS FLEXNET type of network. Additionally, or alternatively, the control circuit 16 simply logs such information and provides it responsive to receiving a query.

In the same or another embodiment, the control circuit 16 is configured to query or otherwise read the pressure sensor 22 at a configurable duty cycle. These queries may be undertaken during normal operation while gas is flowing with the valve 12 in the open position, and after the valve 12 has been closed. In either case, the pressure readings thus taken by the control circuit 16 are compared to high and low pressure thresholds, which define the normal operating range of gas pressures for the gas shut-off valve assembly 10. These values are, for example, preconfigured in memory in the gas shut-off valve 10 during its initial manufacture.

Detection of live gas pressure above the high-pressure threshold or below the low-pressure threshold is deemed an abnormal or unsafe gas pressure, and the control circuit 16 in one or more embodiments is configured to close the valve 12 in response to detecting abnormal gas pressure. Further, to support subsequent analysis, the control circuit 16 in one or more embodiments is configured to log the recorded pressures and the respective recording times. It may keep such data in a running pressure log, and may provide for particularized saving of the max-min pressures. Still further, in at least one embodiment, the control circuit 16 generates an alarm signal in response to detecting abnormal gas pressure. For example, it may send an abnormal pressure alarm message to the AMR network 42, where that message includes the recorded values giving rise to the alarm, along with valve closure status, relevant times, etc.

Turning from these example electronic and algorithm details, FIG. 8 depicts a partial cross-sectional view of the gas shut-off valve assembly 10, shown in context with an associated inlet (upstream) gas line 90 and a corresponding outlet (downstream) gas line 92. One sees that the gas shut-off valve assembly 10 includes an inlet port 100, for receiving gas from the inlet gas line 90, and includes an outlet port 102, for providing gas to the outlet gas line 92.

Further, one sees that the gas shut-off valve assembly 10 includes a body member 104 that is configured for mounting inline with a gas pipe—i.e., interposed between the inlet and outlet gas lines 90 and 92. The body member 104 defines a fluid passage 106 between the inlet 100 and the outlet 102, and the valve 12 is configured to act on gas flow through the fluid passage 106.

FIG. 8 also provides an example illustration of the aforementioned valve seating area, denoted here by reference numeral 108. Additionally, the diagram depicts an example housing 110, for enclosing the control circuit 16 and motorized drive 14. In at least one embodiment, the housing 110 is configured for sealed mounting to one side of the body member 104, and it provides a watertight enclosure for the electronics and power supply/battery of the gas shut-off valve assembly 10. FIG. 9 provides a perspective view of this arrangement.

Figure 11:
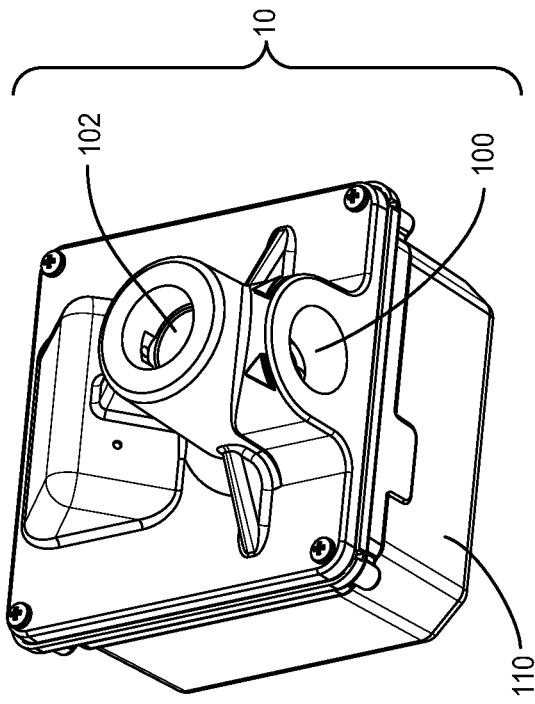
FIG. 11 is a perspective view of the gas shut-off valve assembly shown in FIG. 10.
Figure 10:
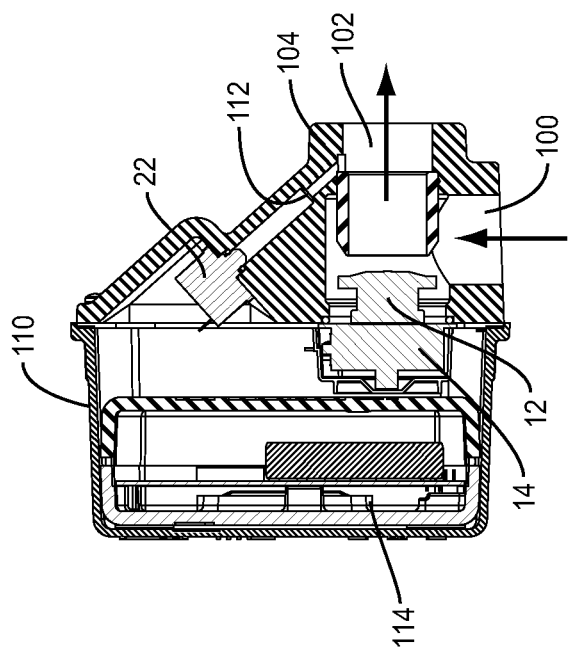
FIG. 10 is a cross-sectional diagram providing a partial side view of an embodiment of a gas shut-off valve assembly configured for vertical mounting and operation.

Further, whereas FIGS. 8 and 9 illustrate an embodiment of the gas shut-off valve assembly that is configured for horizontal mounting, FIGS. 10 and 11 illustrate an embodiment that is configured for vertical mounting. FIG. 10 shows this configuration in a partially detailed cross-sectional view, while FIG. 11 provides a perspective view. While not a limiting example, the depicted configuration offers advantageous mounting of the gas shut-off valve assembly 10 in conjunction with a residential or other gas meter. In this regard, one sees that the embodiment of FIGS. 10 and 11 includes a vertically-oriented inlet 100 and a horizontally-oriented outlet 102, for making a right-angle bend.

Further, with respect to FIG. 10 in particular, one sees a fluid passageway 112, which is configured within the body member 104 to allow the pressure sensor 22 to sense gas pressure on the downstream side of the valve 12. One also sees a printed circuit board assembly 114, which is configured for carrying the control circuit electronics, etc.

With these example configurations in mind, it will be appreciated that the gas shut-off valve assembly 10 is configured for horizontal or vertical installation. That is, one type of gas shut-off valve assembly 10 is intended to be mounted horizontally and that is considered to be its nominal orientation or attitude, and another type of gas shut-off valve 10 is intended to be mounted vertically, and that is considered to be its nominal orientation or attitude.

Correspondingly, the control circuit 16 is configured to include, or otherwise be associated with, a tilt detector, such as the tilt/position sensor 28 that is illustrated in FIG. 1. In such embodiments, the control circuit 16 is configured to close the valve 12 responsive to detecting a tilting of the gas shut-off valve assembly 10 away from the horizontal or vertical. Additionally, or alternatively, the control circuit 16 logs the tilt event and/or generates a tilt alarm.

In a further non-limiting mechanical example, FIG. 12 illustrates an exploded view of the gas shut-off valve assembly 10 in one embodiment. One sees the use of an electronics module 120 with a flex-circuit connector 122 to provide motor control signals to the motorized drive 14. The depicted housing 110 will be understood to provide weatherproof containment for these and other parts of the gas shut-off valve assembly.

Of course, those of ordinary skill in the art will appreciate that the gas shut-off valve assembly 10 may be implemented according to a number of mechanical variations. Further, it will be understood that in one or more embodiments the gas shut-off valve assembly 10 is configured as a remotely controlled, automatic, electronic gas shutoff for natural gas, propane or fuel gas service. While in service, the gas shut-off valve assembly 10 in at least one embodiment continuously monitors incoming radio commands and locally evaluates conditions of gas pressure, assembly tilt/tamper, and seismic vibrations, and reports an alarm when the control circuit 16 evaluates the status of any of these functions as being unsafe.

Thus, in at least one such embodiment, the gas shut-off valve assembly 10 is opened or closed remotely via radio control commands sent via the AMR network 42, and it reports valve status/position and alarms via its communication interface 38. Still further, in at least one embodiment, the gas shut-off valve assembly is additionally configured for manual opening and closing, wherein such manual control provides override and/or back-up control for the valve 12. Similarly, in one or more embodiments, the gas shut-off valve assembly 10 opens and/or closes the valve 12 in response to discrete signals and/or commands input to it through its additional I/O 44. Such control may be subject to tamper-restrictions, such as key-based authentication, password control, coded signaling, etc.

With these examples in mind, along with the other embodiments disclosed herein, those of ordinary skill in the art will recognize other features and advantages of the invention. Therefore, it is to be understood that the invention is not to be limited to the specific embodiments disclosed and that modifications and other embodiments are intended to be included within the scope of this disclosure. Indeed, the present invention is not limited by the foregoing disclosure, and instead is limited only by the accompanying patent claims and their legal equivalents.

What is claimed is:

1. A gas shut-off valve assembly comprising:
   a valve movable between an open position that permits gas flow through the gas shut-off valve assembly and a closed position that prevents gas flow through the gas shut-off valve assembly;
   a motorized drive configured to move the valve between the open and closed positions; and
   a control circuit that includes or is associated with a pressure detection circuit and a valve position detection circuit;
   wherein said control circuit is configured to close the valve via the motorized drive in response to detecting a closure condition, and is further configured to initially verify valve closure based on directly or indirectly detecting movement of the valve into the closed position, and to subsequently verify valve closure based on monitoring gas pressure on a downstream side of the valve, after said initially verifying valve closure;
   wherein said control circuit is configured to monitor the gas pressure based on measuring gas pressure at different times and evaluating the measured gas pressure over time, to determine a valve closure status as closed or not closed; and
   wherein the control circuit is configured to retry valve closure one or more times, responsive to determining the valve closure status as not closed.

2. A gas shut-off valve assembly comprising:
   a valve movable between an open position that permits gas flow through the gas shut-off valve assembly and a closed position that prevents gas flow through the gas shut-off valve assembly;
   a motorized drive configured to move the valve between the open and closed positions; and
   a control circuit that includes or is associated with a pressure detection circuit and a valve position detection circuit;
   wherein said control circuit is configured to close the valve via the motorized drive in response to detecting a closure condition, and is further configured to initially verify valve closure based on directly or indirectly detecting movement of the valve into the closed position, and to subsequently verify valve closure based on monitoring gas pressure on a downstream side of the valve, after said initially verifying valve closure; and
   wherein the control circuit is configured to detect valve closure failure based on said monitoring and to initiate a valve clearing routine responsive to detecting said valve closure failure, and wherein, for said clearing routine, the control circuit is configured to attempt to cycle the valve from the open position to the closed position a defined number of times.

* * * * *